United States Patent [19]

Takata

[11] Patent Number: 5,040,852
[45] Date of Patent: Aug. 20, 1991

[54] BRAKE DEVICE

[75] Inventor: Koji Takata, Itami, Japan

[73] Assignee: Sumitomo Electric Industries, Ltd., Osaka, Japan

[21] Appl. No.: 502,283

[22] Filed: Mar. 30, 1990

[30] Foreign Application Priority Data

Apr. 3, 1989 [JP] Japan .................................. 1-85176

[51] Int. Cl.$^5$ ............................................ B60T 8/58
[52] U.S. Cl. .................................. 303/100; 188/359; 303/110; 303/114; 303/119
[58] Field of Search ........................... 303/100, 50–56, 303/13–17, 113, 114, 116, 119, 101, 93, 110, 97, 96, 98, 99; 188/358, 359, 181 C, 181 A; 60/545, 547.1, 550, 553; 91/391 R; 180/197

[56] References Cited

U.S. PATENT DOCUMENTS

| | | | |
|---|---|---|---|
| 4,435,021 | 3/1984 | Hoenick | 303/93 X |
| 4,818,038 | 4/1989 | Ocvirk et al. | 303/119 |
| 4,826,255 | 5/1989 | Volz | 303/100 X |
| 4,950,028 | 8/1990 | Harrison | 303/113 X |

Primary Examiner—Douglas C. Butler
Attorney, Agent, or Firm—Wenderoth, Lind & Ponack

[57] ABSTRACT

A brake device has a static pressure line for generating brake fluid pressure in at least one line by manual operation, a dynamic pressure source such as a power pump, an electronic control unit, a stroke sensor for detecting the control input of the manual operation, a unit for measuring or estimating the vehicle deceleration, a first control valve adapted to alternately supply and not supply pressure fluid from the dynamic pressure source to the static pressure line, and a second control valve adapted to alternately discharge and not discharge pressure fluid from the static pressure line to a reservoir. The electronic control unit feeds operating commands to the first and second control valves to introduce a predetermined amount of pressure fluid from the dynamic pressure source into the static pressure line or discharge the pressure fluid in the static pressure line into the reservoir so that the relation between the stroke detected by the stroke sensor and the vehicle deceleration will fall within a predetermined range.

9 Claims, 2 Drawing Sheets

BRAKE DEVICE

This invention relates to a brake device which makes it possible to not only perform the antilock function but also improve the pedal feeling by shortening the pedal stroke with a minimum addition of elements.

In reducing the cost of a vehicle-mounted antilock control device, it is the most important consideration from which the fluid for pressure recovery should be supplied after pressure reduction.

In a dynamic pressure line having a dynamic pressure source and a pressure control valve for adjusting the pressure from the dynamic pressure source, pressure can be recovered simply by reconnecting the line to a dynamic pressure generator after the pressure fluid has been discharged in a pressure reduction phase. But to replenish a static pressure line with fluid, it has to have a separate circulating pump or a power cylinder assembly for pressure recovery. This will result in an increase in cost.

On the other hand, various fluid pressure boosters for reducing the pedal force have been proposed. But if the system has a static pressure line as a provision against failure of the dynamic pressure source, it is difficult to meet both the requirement of lightening the pedal force and that of shortening the pedal stroke. Namely, if the effective sectional area of a master cylinder for generating a static pressure is increased, the pedal stroke can be kept small while the pedal force can be reduced to any desirable level by the assist of a suitable pressure booster as far as the dynamic pressure source is intact. But in case of failure in the dynamic pressure source, the pedal force would become excessively large. On the other hand, if the effective area of the master cylinder is made small, the pedal force in case of a failure in the dynamic pressure source can be reduced but the pedal stroke tends to be long in normal conditions.

It is an object of the present invention to provide a brake device which is capable of 1) recovering pressure in the static pressure line after pressure reduction for antilock and 2) shortening the pedal stroke in normal conditions and so as to be compatible with lightening the pedal force in case of dynamic pressure source failure with a minimum addition of cost and which allows setting the relation between the pedal stroke and the deceleration in any desired non-linear manner and even adding other factors, if necessary.

In accordance with the present invention, there is provided a brake device comprising: a static pressure generating means (or a static pressure line) for generating brake fluid pressure in at least one line by manual operation, a dynamic pressure source, an electronic control unit, a stroke sensor for detecting the quantity of the manual operation, means for measuring or estimating the vehicle deceleration, a first control valve for controlling the supply of pressure fluid from the dynamic pressure source to the static pressure line, and a second control valve for controlling the discharge of pressure fluid from the static pressure line to a reservoir; the electronic control unit giving commands to the first and second control valves to introduce the pressure fluid from the dynamic pressure source into the static pressure line or discharge the pressure fluid in the static pressure line into the reservoir so that the relation between the stroke detected by the stroke sensor and the vehicle deceleration will fall within a predetermined range.

The brake device according to the present invention should preferably have the structure including wheel speed sensors for detecting the rotating speeds of the wheels and an antilock device for controlling the fluid pressure introduced into the wheel brakes (which should be located downstream of the point where the pressure fluid in the dynamic pressure source is introduced if it is provided in the static pressure line).

In this case, a single valve may be used which serves both as a pressure reducing valve for antilock and as the second control valve. Or discharge of pressure fluid may be controlled from upstream of the antilock device through an independent second control valve. In the latter case, the first and second control valves may be combined into a three-position control valve which serves both purposes. Further, as will be described later, a limit valve may be provided in the static pressure line to prevent any abnormal pressure rise downstream of the limit value when an excessive pedal force is applied.

Also, failure in the dynamic pressure source or the static pressure line may be judged by the electronic control unit to prohibit the opening of the first and second control valves. Further, the abovementioned failures and an abnormally large pedal force application under the normal dynamic pressure source condition may be distinguished so that in the latter case, the prohibition of opening of the control valves may be cancelled.

According to the present invention, the pedal stroke and the vehicle deceleration are detected and the pressure fluid in the dynamic pressure source is directly introduced into the static pressure line or discharged into the reservoir by use of the electronic control unit and the pressure control valves so that the pedal stroke and the vehicle deceleration will be in a predetermined relationship with each other, thereby setting the pedal stroke in normal conditions in such a manner that a desired pedal feeling is obtainable without increasing the effective sectional area of the master cylinder.

In other words, the brakes are applied by use of the fluid pressure generated by the pedal force, preferably through the fluid pressure booster, the vehicle deceleration at that time is detected, and the static pressure line is selectively connected directly to the dynamic pressure source or to the reservoir so that the pedal stroke will be in a predetermined relationship with the deceleration detected, thereby controlling the quantity of fluid in the static pressure line.

According to the present invention, it is the pedal stroke shortening effect that is electronically controlled. Therefore, even in case of failure in the electronic control line, the pedal force lightening effect will not be affected as long as the dynamic pressure source is working normally.

Comparing with a conventional brake device which provides an antilock function and a fluid pressure booster, the elements additionally necessary for this invention are basically only a pedal stroke sensor and an electronic control valve (a two-position control valve of a pulse width modulation (PWM) type or a flow control valve capable of smooth pressure control) as the first control valve.

If the control valve used for the pressure reduction for antilock is not suitable for smooth control, a second control valve has to be provided separately. In that case, the first and second control valves may be combined into a single valve which serves both purposes.

On the other hand, a re-circulating pump and an intermediate reservoir can be omitted if the system is of a re-circulating type antilock, and if it is an expansion type antilock, an expansion piston assembly can be omitted.

Thus according to the present invention, the pedal shortening effect and the degree of shortening can be set in a desired non-linear fashion with a high cost performance.

According to the present invention, suitable sensors and switches other than the pedal stroke sensor may be added to improve controllability and failure detectability.

For example, the addition of a vehicle acceleration/deceleration sensor will serve to considerably improve the accuracy of estimation of the vehicle deceleration, compared with the case where the vehicle speed and deceleration are estimated only from wheel speed sensors which are originally provided for antilock control.

Also, a pressure sensor provided for measuring the pressure in the static pressure line will greatly improve the control characteristics through the possible use of pressure minor loop control.

Further a pressure switch for warning of reduction in the dynamic pressure may be provided in the dynamic pressure source to prohibit the actuation of the control valves for the static pressure line if the pressure in the dynamic pressure source should drop, thus preventing the loss of fluid through the static pressure line.

Other features and objects of the present invention will become apparent from the following description taken with reference to the accompanying drawings, in which.

Figure 1:
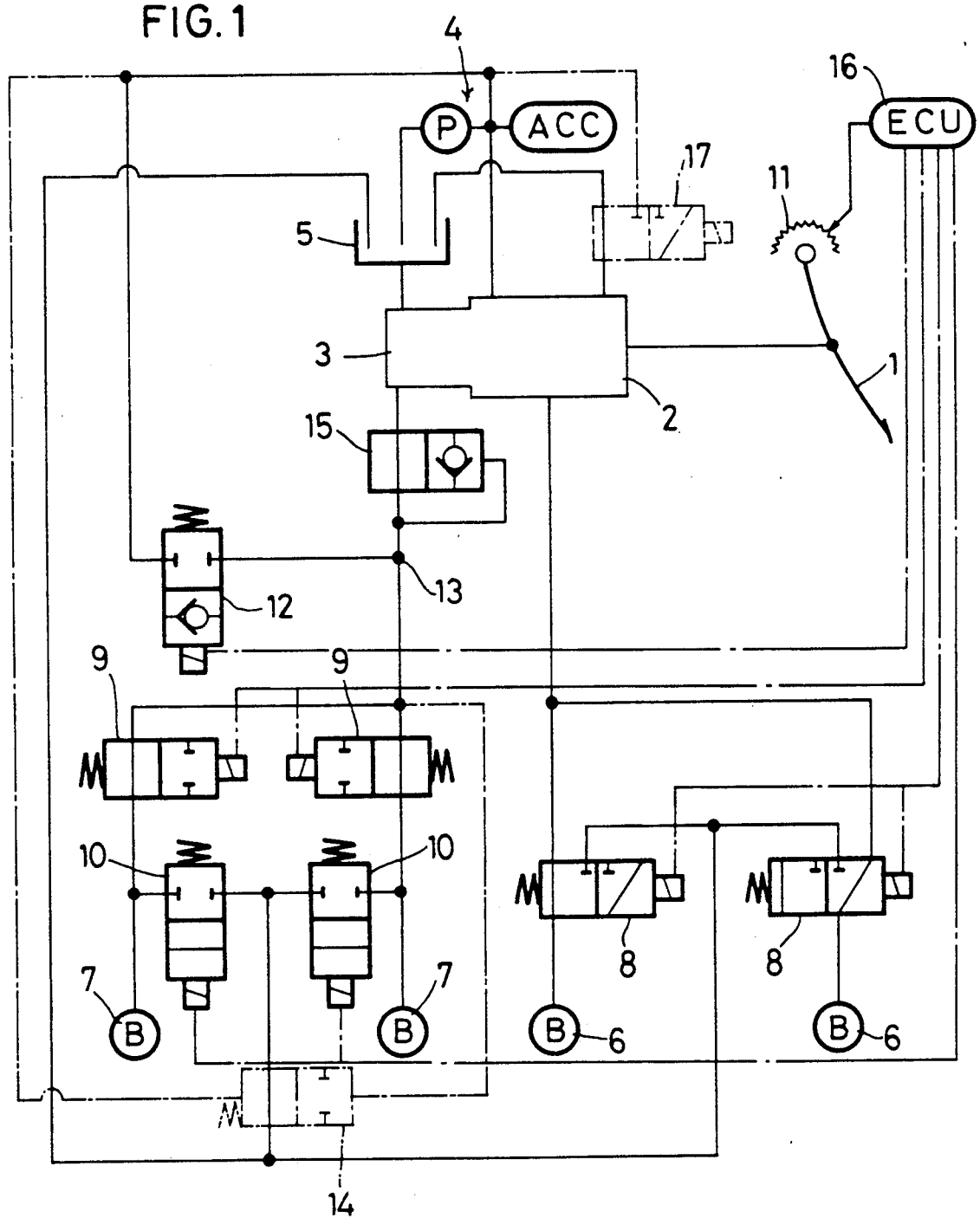
FIG. 1 is a circuit diagram of one embodiment of the present invention.

Numeral 1 in FIG. 1 designates a brake pedal as a typical manual control end. A fluid pressure booster 2 of any type cooperates with a master cylinder 3 as a static pressure generator.

Though the internal structure of the booster 2 is not shown, it comprises, as with any other conventional one, a push rod associated with the pedal 1, a dynamic pressure piston for generating fluid pressure in a dynamic pressure chamber, a mechanical pressure control valve for controlling communication of the dynamic pressure chamber with a dynamic pressure source 4 and a reservoir 5 according to the relative piston between the push rod and the dynamic pressure piston and for generating pressure (dynamic pressure) in the dynamic pressure chamber in proportion to the pedal stepping force in normal conditions, and a master cylinder piston for producing static pressure in cooperation with the dynamic pressure piston. The dynamic pressure adjusted by the pressure control valve drives the master cylinder piston on one hand and gives a reaction force to the push rod on the other hand. This reaction force is transmitted to the pedal through the push rod.

If the dynamic pressure source should fail, the reaction force by the dynamic pressure will disappear so that the dynamic pressure piston will be pushed directly by the push rod, thus producing static pressure in the master cylinder. In other words, at the time of failure in the dynamic pressure source, the static pressure multiplied by the effective area of the master cylinder is transmitted to the pedal as a reaction force of the push rod.

Therefore the effective area of the master cylinder may be determined by the pedal force required during the failure in the dynamic pressure source and the effective pressure receiving area of the push rod may be determined by the pedal force required in normal conditions.

As described above, when producing dynamic pressure by the booster 2, it is advantageous from an economical viewpoint to introduce the dynamic pressure into brakes in one line as it is. In this method, as shown in the drawings, the dynamic pressure is introduced into brakes 6 in one line whereas the static pressure from the master cylinder is introduced into brakes 7 in the other line.

Further, the brake device shown in the figure has an electronic control unit 16 for antilock control. It actuates control valve 8 or valves 9 and 10 (10 have the function as the second control valves in the present invention as well; 9 are hereinafter referred to as third control valves; and 8 designates an antilock device which also has the function of both control valves 9 and 10) based on the information from wheel speed sensors (not shown) to reduce the brake pressure if any wheel locking tendency is detected and re-increase it thereafter while observing the behavior of the wheels.

These control valves may be two-position control valves such as 8 or may be combinations of the control valves 9 and 10 which serve essentially as three-position control valves. As the two-position control valves, those proposed by the present applicant in Japanese Patent Application 63-135041 will be suitable. The valves 9 and 10 may be replaced with a single three-position control valve capable of increasing, holding and reducing pressure.

In the dynamic pressure line shown in this figure, because pressure fluid is supplied from the dynamic pressure source to the dynamic pressure line through the mechanical pressure control valve in the booster, while brake fluid can be discharged directly into the reservoir 5 through the control valves 8 during the pressure reduction.

The above-described structure belongs to a prior art technique. In embodying this technique, various known structures can be employed.

Next the features of the present invention will be described.

According to the present invention, a pedal stroke sensor 11 such as a potentiometer is provided on a pedal, push rod or other member associated with the pedal. Also a first control valve 12 is provided to control connection between the dynamic pressure source 4 and the static pressure line. The output of the sensor 11 is fed to the electronic control unit 16 to compare it with the vehicle deceleration estimated from the information on the wheel speeds and selectively give control signals to the control valve 12 and the control valves 10 for increasing and reducing the brake pressure in the static pressure line. Namely, if the deceleration is judged to be too low compared with the pedal stroke, a command to open the control valve 12 is given to let the pressure fluid in the dynamic pressure source 4 flow into the static pressure line through an inflow point 13 and thus to increase the pressure in the static pressure line. This will simultaneously increase the pressure in the dynamic pressure line through the dynamic pressure piston in the booster 2. The pressure thus increased serves to increase the braking force and the deceleration and at the same time to increase the reaction force of the push rod. If the reaction force is larger than the pedal force applied, the pedal will be pushed back.

Accordingly, if the deceleration is judged to be small compared with the pedal stroke, the braking pressure may increase, thus increasing the deceleration, or the pedal may be pushed back, or both may happen simultaneously, according to the pedal force at that time. As a result the relation between the pedal stroke and the deceleration will fall within a desired range.

If the deceleration is judged to be excessively large compared with the pedal stroke, a command to open will be given to the control valves 10. At this time, because the pressures on the two valves 9 and the two brakes 7 are kept equal to each other, it is necessary to actuate only one of the two valves 10 (of course both may be actuated at the same time).

When the brake fluid is discharged toward the reservoir by opening this valve 10, the pressure in the static pressure line will drop. This will reduce the pressure in the dynamic pressure line through the dynamic pressure piston in the booster 2. Thus the braking force, the vehicle deceleration and the reaction force of the push rod will drop. As a result, the drop of the vehicle deceleration owing to the drop in the braking force, the increase of the pedal stroke owing to the drop in the push rod reaction force, or both will happen, according to the pedal force at that time. Thus the relation between the pedal stroke and the deceleration falls within a predetermined range.

The inflow point 13 through which the pressure fluid in the dynamic pressure source is introduced into the static pressure line via the control valve 12 should be located nearer to the master cylinder 3 than the valves 9 (upstream side) in order to ensure a sufficient supply of pressure fluid from the dynamic pressure source during the antilock pressure restoration phase.

The pedal position during antilock control can be controlled in various ways by changing the control program in the electronic control unit 16.

For example, the relation between the deceleration and the pedal stroke during antilock control may be kept equal to the relation in normal conditions. In such a case, when the coefficient of friction of the road surface changes during antilock control and the vehicle deceleration changes accordingly, fluid is supplied forcibly into the static pressure line through the control valve 12 so that the pedal stroke will conform to the changes in the deceleration. In other words, a pedal position corresponding to the deceleration is ensured regardless of the pedal force.

As a second method, the pedal stroke at the beginning of antilock control may be maintained throughout the antilock control. Further, control of pedal position may be gradually changed over from the second method to the first method with the progress of antilock control.

Now, measures against various failures in the system shall be described.

If the electronic control line fails, by shutting down the electronic control unit 16, the control valves will return to their inoperative position shown in the figure by the action of respective built-in springs. Thus the stroke shortening effect (to say nothing of the antilock function) will be lost. The maximum possible deceleration obtainable at the full stroke of master cylinder in this failure mode is determined by the setting of master cylinder diameter and stroke which, in turn is determined by the allowable limit of the pedal force at the time of failure in the dynamic pressure line and the allowable limit of the pedal stroke at the time of failure in the static pressure line. But because this deceleration is far greater than the deceleration obtainable when the static pressure line or the dynamic pressure line fails, it will hardly be a problem.

Next, if the static pressure line fails, since the pressure in the dynamic pressure line would not rise sufficiently until the pedal is fully-stroked, it is necessary to prevent the pressure fluid in the dynamic pressure source from being wasted in the mean time.

Namely, in this case, judgement will be made from the stroke-deceleration relationship that the stroke is too large and the deceleration is too low and a command to fully open the valve 12 will be given continuously unless a failure in the static pressure line is detected and the control valve 12 is closed.

As a countermeasure against this, if the stroke-deceleration relationship fails to return to normal in spite of the fact that a full-open command (or an open command) has been given for over a predetermined period of time, the actuation of the valve 12 may be prohibited (a close command is given) based on the judgement that there is a failure in the static pressure line.

Next, in case of failure in the dynamic pressure line or in the dynamic pressure source, since it is impossible to supply fluid from the dynamic pressure source, it is necessary to limit the flow of fluid from the static pressure line through the valves 12 and 10 to as low a level as possible.

This fluid leakage prevention may be carried out mechanically or by electronic control. As a mechanical method, a check valve may be provided in the valve 12 to prevent the backflow toward the dynamic pressure source 4. The check valve may also be provided independently of and in series with the valve 12. But it will be economically advantageous to provide it in the valve 12.

On the other hand, as for the valves 10, a valve 14 (a differential pressure changeover valve in the figure) may be added to prohibit the discharge of fluid from the valves 10 to the reservoir 5 if the pressure in the static pressure line is higher than that in the dynamic pressure line by more than a predetermined value (which should be a small value). But because this valve 14 is rather costly, it should be omitted and instead the below-described electronic control would be more recommended.

In employing electronic control, if a low pressure warning switch is provided in the dynamic pressure source, the actuation of the valves 10 may be prohibited based on low pressure warning from the switch. If the valve 12 is not provided with a check valve, its actuation may also be prohibited.

Since the stroke-deceleration relationship in normal conditions widely differs from that in case of failure in the dynamic pressure source, the possible range of fluctuation of the stroke-deceleration relation in normal conditions and that in case of failure in the dynamic pressure source may be memorized in the electronic control unit 16 beforehand so as to judge whether the dynamic pressure source has failed or not by comparing the relation with them and to prohibit the valves 10 and 12 from being actuated. This method may eliminate the necessity of the low pressure warning switch. Further these software failure judgement means can be commonized to some extent with those against failure in the static pressure line.

However, since some time is necessary from the occurrence of failure till the failure is detected and the valve 12 is closed, the pressure in the static pressure line may leak through the valve 12 in the mean time. Thus the above-described check valve is desirably provided in the valve 12 or in series with it to cope with failure instantly.

A problem will arise if an abnormally large pedal force is applied while the dynamic pressure source is normal. In such a case, the dynamic pressure in the booster 2 becomes equal to the pressure of dynamic pressure source and further the push rod directly pushes the dynamic pressure piston so that the pressure in the static pressure line exceeds that in the dynamic pressure line. In this case, since the wheels in the static pressure line would lock owing to an abnormal rise in pressure, it is not preferable to prohibit pressure reduction for antilock control. But as far as the pressure in the static pressure line is higher than that in the dynamic pressure line, the fluid supply from the dynamic pressure line is impossible and thus the antilock pressure reduction is prohibited.

In order to solve this problem, a limit valve 15 may be provided between the master cylinder 3 and the inflow point 13 of the pressure fluid in the dynamic pressure source to cut off the flow of fluid if the pressure at the downstream or upstream side of the valve 15 is higher than the actuating point of the valve. Its actuating point should be set slightly lower than the lowest allowable pressure of the normally functioning dynamic pressure source. Of course, this preset pressure should be set at such a value that a sufficient deceleration can be obtained even if the friction material degrades.

The control valve 12 used with the limit valve 15 should preferably be provided with the aforementioned check valve.

Also, the limit valve 15 should desirably be of such a type as to check only the fluid flow from the master cylinder to the brakes when actuated as shown in the figure, rather than of the type in which the fluid flows in both directions are shut off when actuated. For easiness of manufacture, it is preferable to detect not the pressure at the upsteam side of the installation point but the one at its downsteam side and compare it with the spring. But any other arrangement is possible.

With this arrangement, even if an abnormally large pedal force is applied, the valves 9 and 10 can perform antilock control on the wheels in the static pressure line while supplying the fluid in the dynamic pressure line through the valve 12.

In this case, if the valve 14 is used, it is necessary to set the working differential pressure to such a value that it will not be shut by the shock upon the actuation of the other valves.

If a software prohibition of the actuation of the valves 10 and 12 is used, it is necessary to judge with the electronic control unit 16 whether the dynamic pressure source or the static line has failed (the actuation of the valves 10 and 12 must be prohibited in such a case) or an abnormally large pedal force has been applied (the actuation of these valves must not be prohibited in such a case). It will be distinguishable, however, because if an abnormally large pedal force is applied, though the stroke may increase by a quantity corresponding to the overshooting of pressure before starting antilock control, the stroke-deceleration relation in this state is nearer to that in normal conditions than in case of failure in the dynamic pressure source, and even much nearer than in case of failure in the static pressure line. Further if an abnormally large pedal force is applied, antilock control is executed on all the wheels in the process of pressure increase and after the pressure has reached a predetermined value the stroke will not further fluctuate because the valve 15 is actuated. These phenomena can be utilized in distinguishing between the above two cases. Therefore, it is theoretically possible to deal with a failure in the static or dynamic pressure line and an excessively large pedal force simply by the provision of suitable control algorithm in the electronic control unit 16 without the valve 14 or the switch for the warning of low pressure in the dynamic pressure source.

If an automatic braking functions such as traction control to the brake device of this embodiment is required, a known structure may be employed in which a control valve 17 is additionally provided in the discharge circuit extending from the booster 2 to the reservoir 5 to selectively connect the dynamic pressure chamber to the dynamic pressure source or to the reservoir. In this case, the booster should be provided with a suitable push rod stopper.

Further the antilock device in the dynamic pressure line should preferably be a three-position control valve having a hold (shut-off) position. To perform only traction control, the changeover valve 17 may be provided at an output terminal of the booster 2 or the master cylinder leading to the driven wheels.

Figure 3:
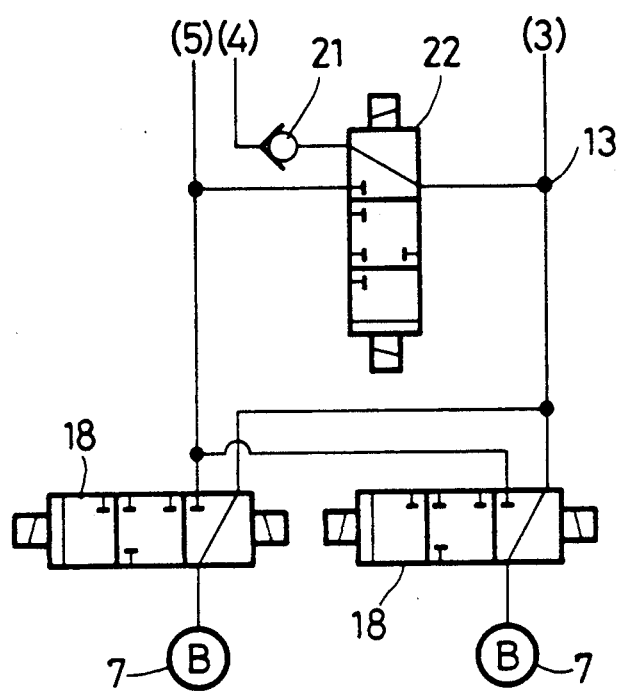

In the above description, we showed a type in which fluid is discharged into the reservoir from the static pressure line through the valves 10 if pressure fluid is supplied excessively through the valve 12. If it is not preferable to use the valves 10 for both antilock control and control of pressure fluid to the static pressure line in the normal condition, the valve 12 may be modified to supply fluid from the dynamic pressure source and to discharge fluid into the reservoir so as to serve both purposes as shown in FIG. 3. In this case, the valve 12 has to be a type which takes such a position as to shut off both the inflow and outflow of fluid if there is no input from the electronic control unit 16.

Figure 2:
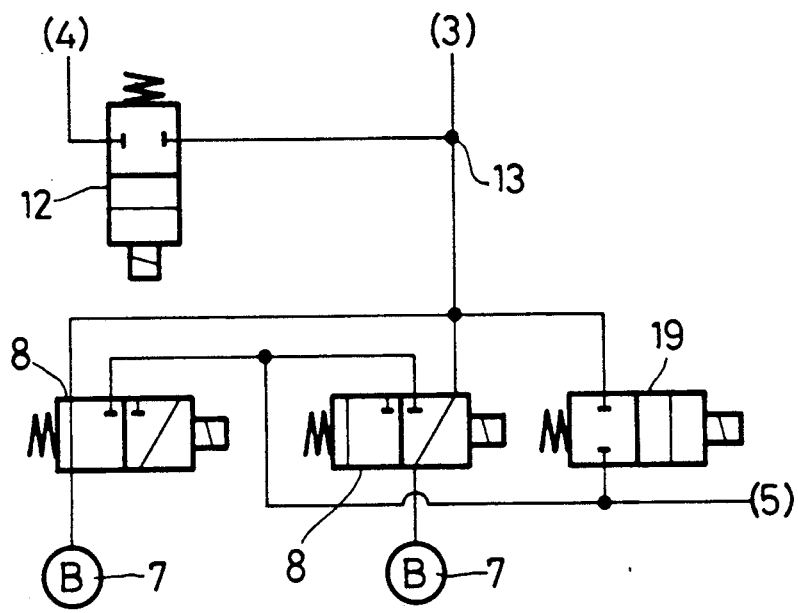
FIGS. 2 and 3 are circuit diagrams of portions of other embodiments.

FIGS. 2 and 3 show an embodiment in which antilock control and the supply of pressure fluid to the static pressure line are carried out separately from each other (by use of independent control valves). In FIG. 2, a second control valve 19 is provided between the reservoir 5 and an outflow point 13 of pressure fluid located upstream of the control valves 8, independently of the first control valve 12.

In FIG. 3, a control valve 22 having a combined structure of the first control valve and the second control valve is used to selectively connect the dynamic pressure source 4 or the reservoir 5 to the static pressure line. A check valve 21 shown in FIG. 3 may also be mounted in the valve 22.

As the antilock device, the two-position control valves 8 are used in FIG. 2 whereas in FIG. 3 one three-position control valve 18 is used. Other valves such as the valves 9 and 10 shown in FIG. 1 may be used as the antilock device.

With the circuit structures shown in FIGS. 2 and 3, the control performance of the pedal stroke-deceleration relation are independent of the mechanical control characteristics of control valve for antilock pressure reduction. Therefore, if no smooth control is expected of the control valve for antilock pressure reduction, the second control valve should be provided independently of the antilock device.

What is claimed is:

1. A brake device comprising:
   a static pressure generating means or a static pressure line for generating brake fluid pressure in at least one line by manual operation,
   a dynamic pressure source,
   an electronic control unit,
   a stroke sensor for detecting the quantity of said manual operation,
   means for measuring or estimating the vehicle deceleration,
   a first control valve for controlling the supply of pressure fluid from said dynamic pressure source to said static pressure line, and
   a second control valve for controlling the discharge of pressure fluid from said static pressure line to a reservoir;
   said electronic control unit giving commands to said first and second control valves to introduce the pressure fluid from said dynamic pressure source into said static pressure line or discharge the pressure fluid in said static pressure line into said reservoir so that the relation between the stroke detected by said stroke sensor and the vehicle deceleration will fall within a predetermined range.

2. A brake device as claimed in claim 1, further comprising wheel speed sensors for detecting the rotating speed of the wheels, and antilock means for controlling the fluid pressure applied to the wheel brakes, at least the antilock means in said static pressure line being provided downstream of a point through which the pressure fluid in said dynamic pressure source is introduced into said static pressure line via said first control valve.

3. A brake device as claimed in claim 2, wherein a pressure fluid discharge valve for pressure reduction in said antilock means performs the function of said second control valve.

4. A brake device as claimed in claim 2, wherein said second control valve is provided between said reservoir and a pressure fluid outflow point located upstream of said antilock means in said static pressure line.

5. A brake device as claimed in any of claims 1 to 4, further comprising a limit valve provided between the static pressure generating means and the point for introducing the pressure fluid in the dynamic pressure source into the static pressure line through said first control valve to check the movement of pressure fluid from the static pressure generating means toward the brakes if the pressure upstream or downstream of said limit value rises above a threshold pressure determined slightly lower than the lowest pressure of the normally functioning dynamic pressure source.

6. A brake device as claimed in any of claims 1 to 4, wherein said first control valve is provided with a check valve to prevent the backflow of fluid from said static pressure line toward said dynamic pressure source.

7. A brake device as claimed in any one of claims 1-4, further comprising a fluid operated booster for generating a dynamic pressure proportional to the manual operating force by use of the pressure of said dynamic pressure source, and amplifying the manual operating force by use of said dynamic pressure to drive said static pressure generating means, said dynamic pressure also being introduced into the wheel brakes at least in one line.

8. A brake device as claimed in any one of claims 1-4, wherein said electronic control unit gives a command to close said first and second control valves or prohibits a command to open if there is no indication that the relation between the operating stroke and the deceleration will return to normal or if said relation gets out of a predetermined range, in spite of overriding, that is, the fact that a command to open has been given continuously to said first control valve based on the judgement that the stroke is excessively large or the deceleration is excessively low compared with a predetermined relationship between the operating stroke and the deceleration.

9. A brake device as claimed in claim 8, further comprising a limit valve provided between the static pressure generating means and the point for introducing the pressure fluid in the dynamic pressure source into the static pressure line through said first control valve to check the movement of pressure fluid from the static pressure generating means toward the brakes if the pressure upstream or downstream of said limit valve rises above a threshold pressure determined slightly lower than the lowest pressure of the normally functioning dynamic pressure source, and wherein said electronic control unit comprises means for recognizing from the output of said stroke sensor when said limit valve is actuated owing to an excessive manual operating force and thereupon giving a command to open.

* * * * *